(12) United States Patent
Beals (10) Patent No.: US 8,892,675 B2
(45) Date of Patent: Nov. 18, 2014

(54) PROVIDING REMOTE ACCESS TO SEGMENTS OF A TRANSMITTED PROGRAM

(75) Inventor: William Michael Beals, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 125 days.

(21) Appl. No.: 13/370,917

(22) Filed: Feb. 10, 2012

(65) Prior Publication Data
US 2012/0144437 A1 Jun. 7, 2012

Related U.S. Application Data

(63) Continuation of application No. 12/025,579, filed on Feb. 4, 2008, now Pat. No. 8,117,283.

(51) Int. Cl.
| | |
|---|---|
| G06F 15/16 | (2006.01) |
| H04N 21/6587 | (2011.01) |
| H04L 29/08 | (2006.01) |
| H04N 21/658 | (2011.01) |
| H04N 21/845 | (2011.01) |
| H04N 21/2743 | (2011.01) |
| H04N 21/2747 | (2011.01) |

(52) U.S. Cl.
CPC ............ *H04L 67/06* (2013.01); *H04N 21/6587* (2013.01); *H04L 67/28* (2013.01); *H04L 67/2852* (2013.01); *H04N 21/658* (2013.01); *H04L 67/32* (2013.01); *H04L 67/2847* (2013.01); *H04N 21/8456* (2013.01); *H04N 21/2743* (2013.01); *H04N 21/2747* (2013.01)
USPC ........................................ 709/209; 386/241

(58) Field of Classification Search
CPC ......... H04L 67/00; H04L 67/20; H04L 67/28; H04L 67/2823; H04L 67/2833; H04L 67/2857; H04L 65/60–65/601; H04L 65/605; H04N 21/00; H04N 21/20; H04N 21/21; H04N 21/2187; H04N 21/2223; H04N 21/23113; H04N 21/2343–21/23439; H04N 21/274–21/278; H04N 21/45; H04N 21/422; H04N 21/60; H04N 21/65; H04N 21/658; H04N 21/845; H04N 21/8455–21/8456; H04N 21/858–21/8586
USPC .......... 709/203, 217, 219, 231; 386/241, 248; 725/115; 715/723
See application file for complete search history.

(56) References Cited

U.S. PATENT DOCUMENTS

| | | | |
|---|---|---|---|
| 5,857,187 A | 1/1999 | Uenoyama et al. | |
| 6,718,372 B1 | 4/2004 | Bober | |

(Continued)

FOREIGN PATENT DOCUMENTS

WO    WO 2008024723 A2 *    2/2008

OTHER PUBLICATIONS

Wikipedia "Slingbox" excerpt from the Wikipedia internet site located at http://en.wikipedia.org/w/index.php?title=Slingbox, retrieved on Mar. 17, 2008, 3 pages.

(Continued)

*Primary Examiner* — Saleh Najjar
*Assistant Examiner* — Eric W Shepperd
(74) *Attorney, Agent, or Firm* — Ingrassia Fisher & Lorenz, P.C.

(57) ABSTRACT

A method for providing remote access to segments of a transmitted program is presented. The program is recorded, and then stored at a communication server. Information specifying a segment of the stored program is transferred from a communication device to the communication server. Also, a request for access to the specified segment of the stored program is transferred from another communication device to the communication server. In response to the request, the specified segment of the program is transferred from the communication server to the requesting communication device.

18 Claims, 5 Drawing Sheets

(56) References Cited

U.S. PATENT DOCUMENTS

| | | | |
|---|---|---|---|
| 6,747,706 B1* | 6/2004 | Geddes et al. | 348/722 |
| 6,799,251 B1* | 9/2004 | Jacobs et al. | 711/133 |
| 6,931,451 B1 | 8/2005 | Logan et al. | |
| 7,197,758 B1* | 3/2007 | Blackketter et al. | 725/37 |
| 7,925,781 B1* | 4/2011 | Chan et al. | 709/238 |
| 8,560,951 B1* | 10/2013 | Snyder et al. | 715/723 |
| 2002/0069218 A1 | 6/2002 | Sull et al. | |
| 2002/0174431 A1 | 11/2002 | Bowman et al. | |
| 2003/0051252 A1 | 3/2003 | Miyaoku et al. | |
| 2003/0097664 A1* | 5/2003 | Meyers et al. | 725/138 |
| 2003/0182401 A1* | 9/2003 | Moriya | 709/219 |
| 2004/0098465 A1 | 5/2004 | Seo | |
| 2004/0230655 A1* | 11/2004 | Li et al. | 709/205 |
| 2005/0177745 A1* | 8/2005 | Oswald et al. | 713/201 |
| 2006/0047774 A1 | 3/2006 | Bowman et al. | |
| 2006/0095657 A1 | 5/2006 | Rector et al. | |
| 2006/0234684 A1 | 10/2006 | Shin | |
| 2007/0078883 A1* | 4/2007 | Hayashi et al. | 707/102 |
| 2007/0094274 A1* | 4/2007 | Jung | 707/10 |
| 2007/0143809 A1* | 6/2007 | Chen et al. | 725/119 |
| 2007/0178884 A1* | 8/2007 | Donovan et al. | 455/411 |
| 2007/0198532 A1* | 8/2007 | Krikorian et al. | 707/10 |
| 2007/0204064 A1* | 8/2007 | Mail et al. | 709/246 |
| 2007/0266169 A1 | 11/2007 | Chen et al. | |
| 2008/0091796 A1* | 4/2008 | Story et al. | 709/217 |
| 2008/0132163 A1* | 6/2008 | Ilan et al. | 455/3.06 |
| 2008/0313541 A1 | 12/2008 | Shafton et al. | |
| 2009/0157697 A1* | 6/2009 | Conway et al. | 707/10 |

OTHER PUBLICATIONS

USPTO "Non-Final Office Action" mailed Dec. 2, 2009; U.S. Appl. No. 12/025,579, filed Feb. 4, 2008.

USPTO "Final Office Action" mailed Jun. 9, 2010; U.S. Appl. No. 12/025,579, filed Feb. 4, 2008.

USPTO "Notice of Allowance" mailed Dec. 29, 2011; U.S. Appl. No. 12/025,579, filed Feb. 4, 2008.

Chitu, Alex Google Video—Link to a Part of the Video [Online], Jul. 20, 2006; googlesystem.blogspot.com [Retrieved from: http://googlesystem.blogspot.com/2006/07/google-video-link-to-part-of-video.html].

Google "New Feature: Link Within a Video" [Online], Jul. 19, 2006; googlevideo.blogspot.com [Retrieved from: http://googlevideo.blogspot.com/2006/07/new-feature-link-within-video_19.html].

Siegchrist, Gretchen "Free Video Sharing on Google Video" [Online], Apr. 27, 2007; www.archive.org [Retrieved from: http://web.archive.org/web/20070427142038/http://desktopvideo.about.cmo/od/videohostingsites/p/googlevideo.htm].

* cited by examiner

PROVIDING REMOTE ACCESS TO SEGMENTS OF A TRANSMITTED PROGRAM

BACKGROUND

Since the advent of the video cassette recorder (VCR), viewers of transmitted video and audio programming have been able to privately record their favorite programs. As a result, such technology has allowed the viewer to "time-shift" television programs of interest to a subsequent, more convenient time. More recently, digital video recorder (DVR) units, often provided in satellite and cable broadcast programming receivers, or "set-top boxes," have supplied the viewer a more convenient means of audio/video time-shifting by allowing a larger number of programs to be recorded in a more automated fashion without the use of removable storage media.

Typically, the viewer must view the previously-recorded programs or program segments on a display device, such as a television or monitor, connected to the set-top box or standalone DVR containing the recorded content. As a result, the viewer is normally limited in the number of locations at which the viewer may view the recorded content. To address this issue, audio and video content may be transferred or uploaded to a content server, such as an Internet web server or similar communication device, by way of a communications network or connection between a device containing the recorded programming and the content server. A user may then view the uploaded content using any computer or other communication device coupled to the web server over the communications network by downloading or streaming the content from the server to the device. Transfer of the video and audio data both to and from the web server in such a fashion may consume a significant amount of bandwidth provided by the communications network being employed, depending on the image resolution and length of each segment being transferred.

DETAILED DESCRIPTION

Figure 1:
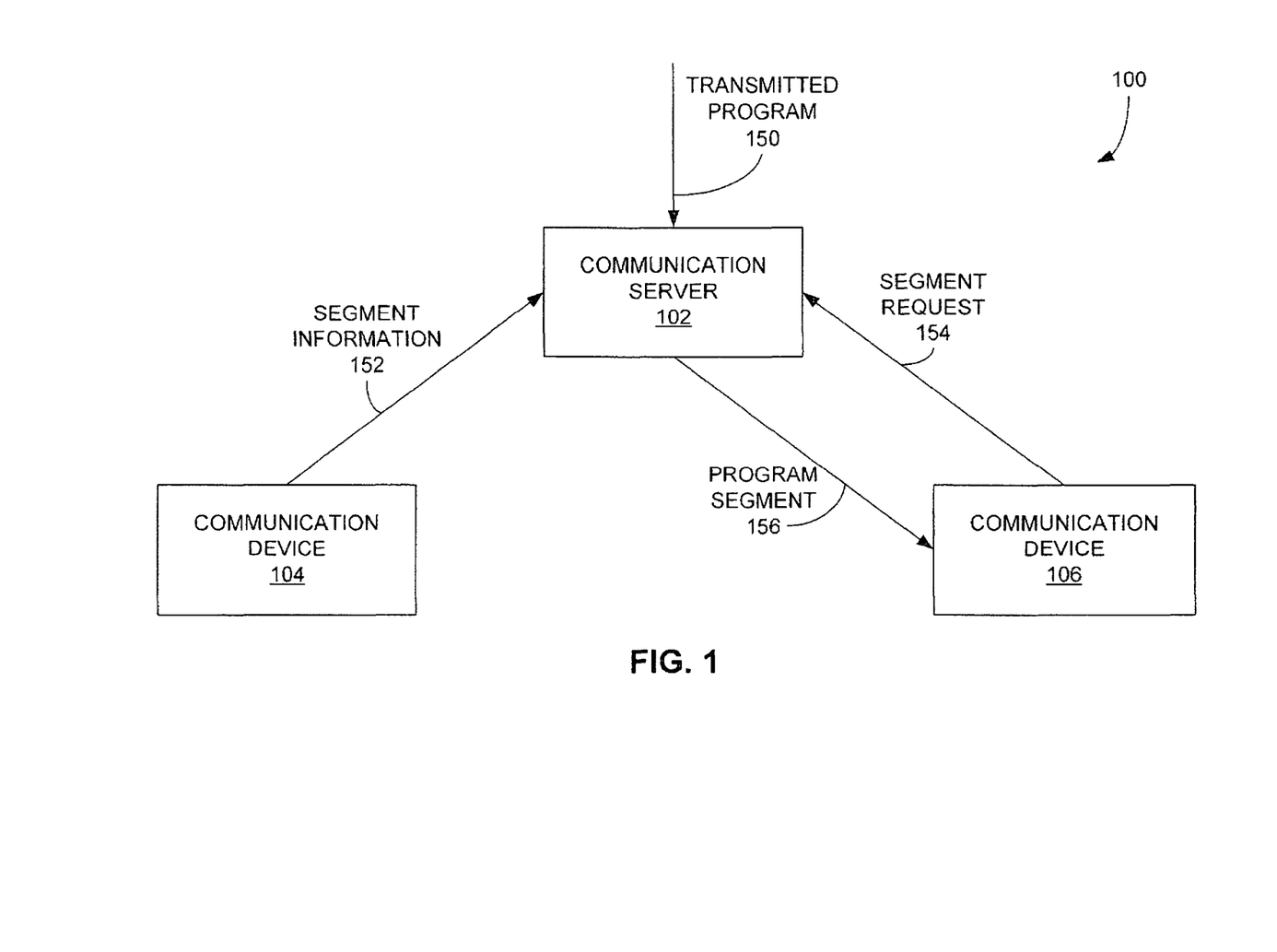
FIG. 1 is a block diagram of a system according to an embodiment of the invention that is configured to provide remote access to segments of a transmitted program.

FIG. 1 provides a block diagram of a system 100 for providing remote access to segments of one or more transmitted programs 150. Generally, a transmitted program may include a contiguous series of video frames, or consecutive samples of audio information, or both, that may be identifiable as a single transmitted presentation. Further, a transmitted program may be a program delivered by any transmission method, such as broadcast, multicast, simulcast, closed circuit, pay-per-view, point-to-point, or other method. Additionally, the program may be transmitted by way of any communication technology, such as by satellite, wire or optical cable, wireless, or other means. The program may also be transferred over any type of communication system, such as the Internet, a local area network, a private network, or a mobile communication system. The system 100 includes a communication server 102, a first communication device 104, and a second communication device 106.

Figure 2:
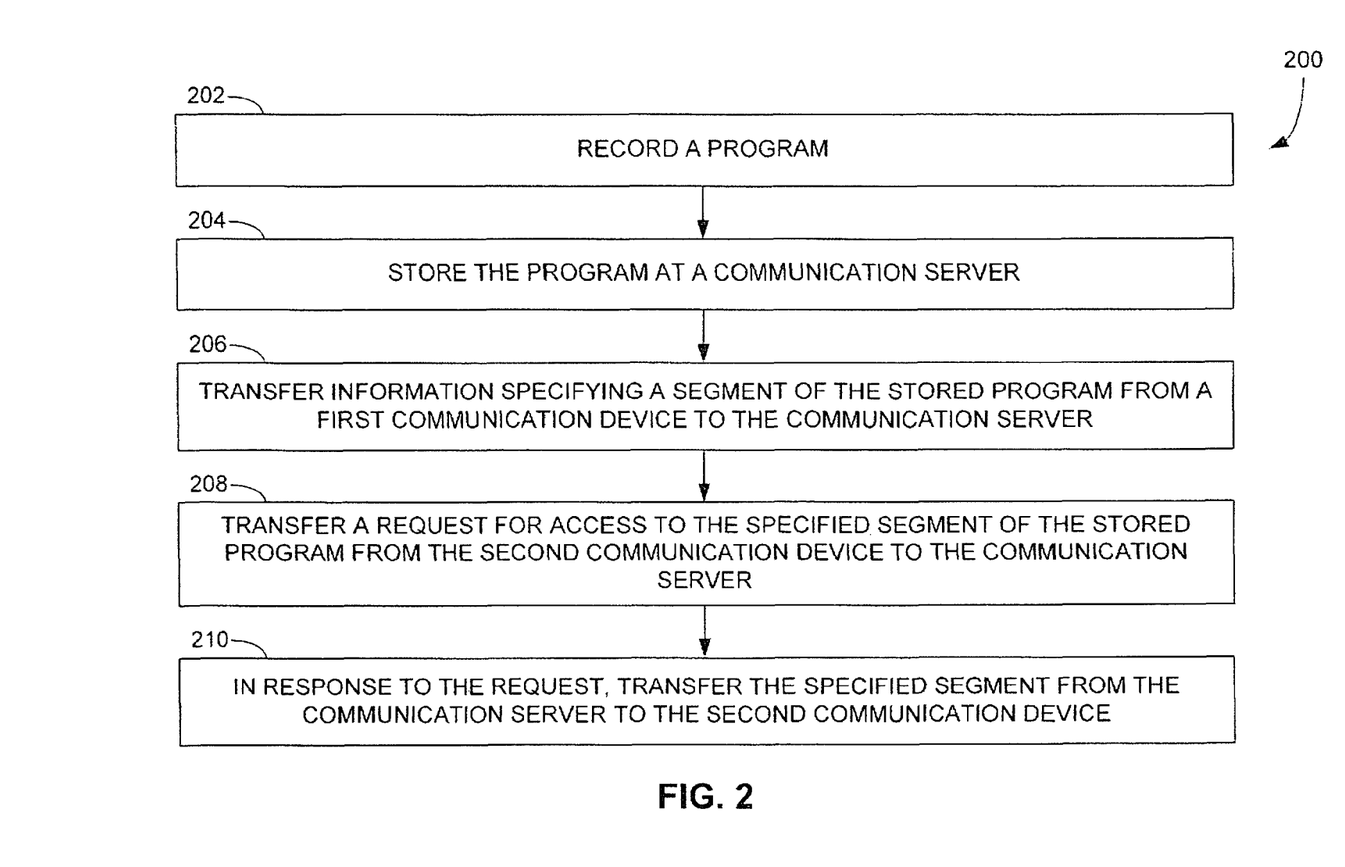
FIG. 2 is a flow diagram of a method according to an embodiment of the invention for providing remote access to segments of a transmitted program.

FIG. 2 presents a flow diagram of a method 200 of operating the system 100 of FIG. 1, although the method 200 may apply to other systems or devices not depicted in FIG. 1. In the method 200, a transmitted program 150 is recorded (operation 202) and stored at the communication server 102 (operation 204). Information 152 specifying a segment 156 of the stored program 150 is transferred from the first communication device 104 to the communication server 102 (operation 206). A request 154 for access to the specified segment 156 of the stored program 150 is transferred from the second communication device 106 to the communication server 102 (operation 208). In response to the segment request 154, the program segment 156 is transferred from the communication server 102 to the second communication device 106 (operation 210). While FIG. 2 depicts a particular sequence for execution of the operations 202-210 shown therein, other orders of execution, including concurrent or overlapping execution, may also be possible while remaining within the scope of the invention.

Figure 3:
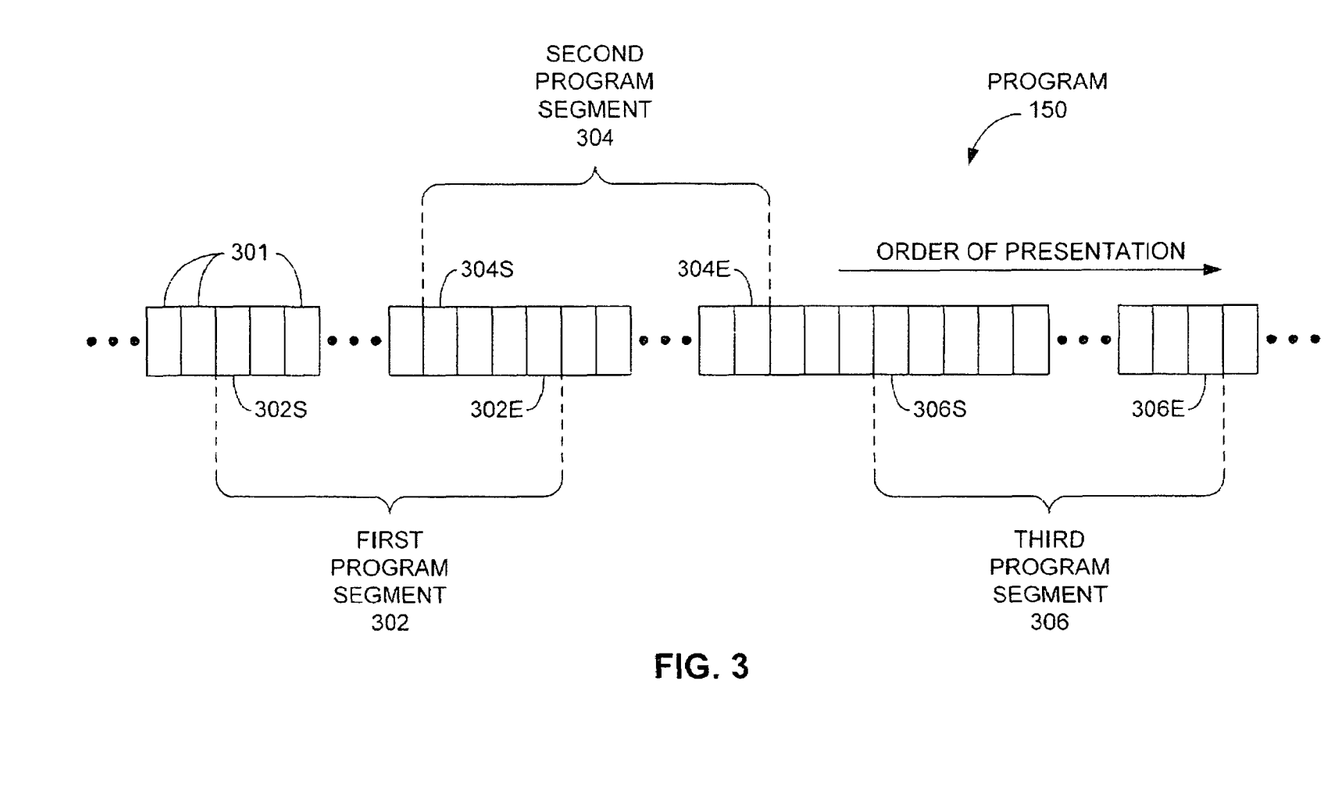
FIG. 3 is a graphical representation of a program denoted in FIG. 2, shown with both overlapping and non-overlapping segments.

FIG. 3 provides a simplified graphical representation of the program 150 denoted in FIG. 1. The program 150 is shown as a series of video frames 301 progressing in time from left to right, although other data organizations for the program 150, including a series of audio samples, may be employed in other implementations. The program 150 may also be formatted according to any of a number of audio and video data formats, such as the digital video format standards promulgated by the Motion Pictures Expert Group (MPEG), such as MPEG-2 and MPEG-4, or the digital audio standard MPEG-1 Audio Layer 3 (MP3). Other embodiments may employ other audio and video data formats not specifically indicated herein.

As used herein, a segment of the program 150 may be any contiguous portion of the program 150, possibly including the entire program 150. The example of FIG. 3 depicts three potential program segments 302, 304, 306, each of which include a number of contiguous frames 301 of the program 150. Each of the program segments 302, 304, 306 is demarcated by a starting point or frame 302S, 304S, 306S and an ending point or frame 302E, 304E, 306E, respectively. As indicated in FIG. 3, the various segments 302, 304, 306 identified for a particular program 150 may overlap (as in the case of the first program segment 302 and the second program segment 304) or not overlap (such as with either the first program segment 302 or the second program segment 304 compared to the third program segment 306). In other scenarios, two separately identified segments may signify the same segment of the program 150 by possessing the same starting and ending points. While FIG. 3 specifically illustrates three segments, any number of segments may be identified for the program 150.

Figure 4:
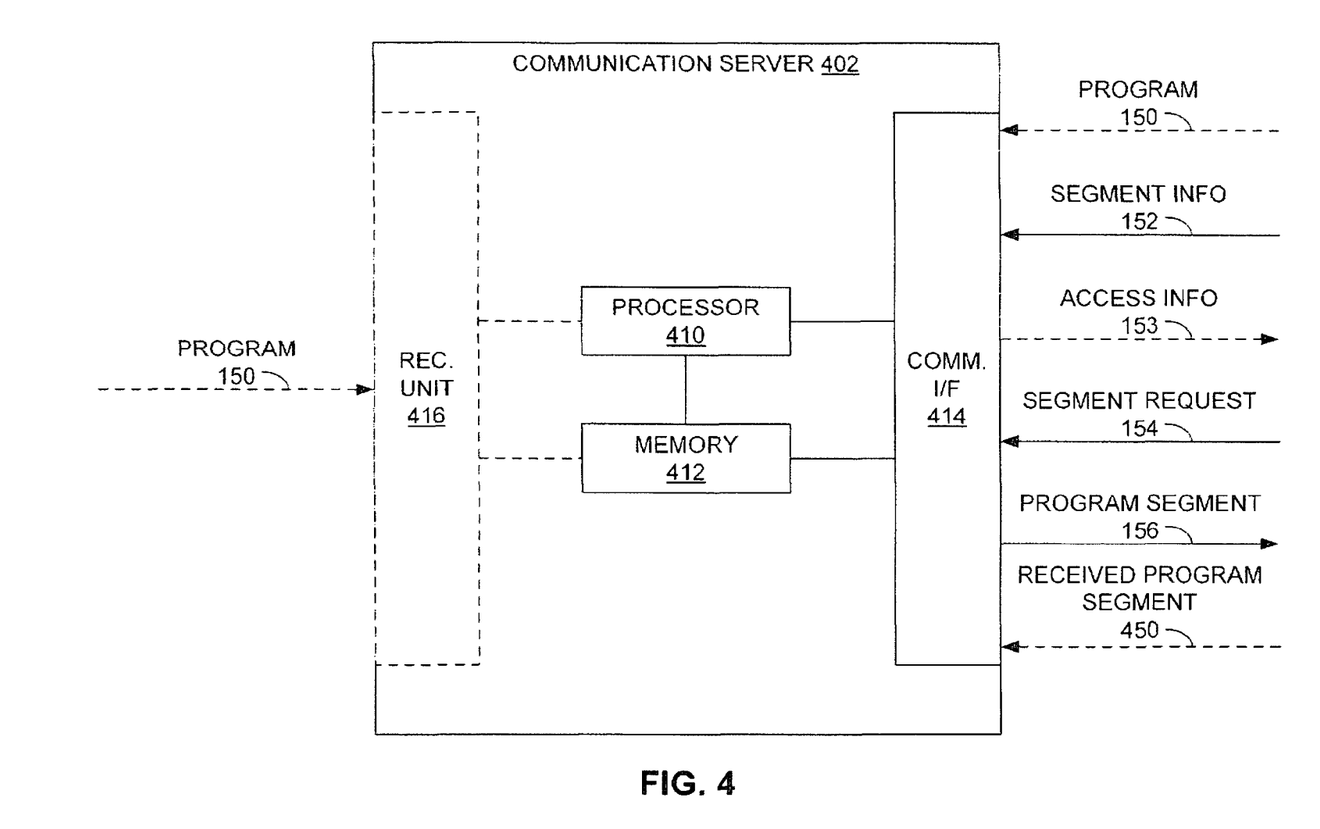
FIG. 4 is a block diagram of a communication server of the system of FIG. 2 according to an embodiment of the invention.

FIG. 4 depicts a communication server 402 that may be employed as the communication server 102 of FIG. 1. The communication server 402 includes a processor 410, a memory 412, and a communication interface 414. In some examples, the communication server 402 may also include a recording unit 416. The communication server 402 also may include other components or units not shown in FIG. 4 or presented herein to simplify the following discussion. While FIG. 4 depicts specific connections between the various components within the communication server 402, other connection configurations that allow the ability to perform the various tasks described below are also possible while remaining within the scope of the invention.

Generally, the communication server 402 may be a server for providing data on the Internet, such as a web server. In this case, the communication interface 414 may implement a Transmission Control Protocol/Internet Protocol (TCP/IP) interface for transferring messages and data between the communication server 402 and other devices coupled to the Internet. In other embodiments, other communications protocols, such as Asynchronous Transfer Mode (ATM) and various wireless communication protocols, may be employed in the alternative.

The processor 410 may be any processor, collection of processors, or other control logic capable of performing the various operations described below. For example, the processor 410 may include one or more microprocessors or microcontrollers configured to execute software instructions for controlling the communication interface 414, the memory 412, and the recording unit 416. The processor 410 may include various hardware components in lieu of, or in addition to, the software to facilitate the various operations described hereinafter.

The memory 412 may be any memory capable of storing transmitted programs, or segments of the programs. Examples of the memory 412 may include volatile memory, such as static random access memory (SRAM) and dynamic random access memory (DRAM), and nonvolatile memory, such as flash memory, magnetic disk drive memory, and optical disk drive memory. Nonvolatile memory may also encompass both removable and non-removable storage media. The memory 412 may also be extended to include external data storage, such as storage available by way of a storage area network (SAN) not co-located with the communication server 402, thus providing a large, extendable storage capacity In some embodiments, the communication server 402 includes a recording unit 416 capable of receiving the transmitted program 150 from a content provider, such as a satellite, cable, or over-the-air broadcast programming provider. In one implementation, the recording unit 416 is configured to select one or more of several programming channels offered by the content provider in order to record one or more transmitted programs presented on the various channels. The recording unit 416 may receive the various channels of programming over a communication network connection, such as an IP connection. In another example, the recording unit 416 may include one or more tuners for receiving the programming channels via a satellite link, cable connection, or a terrestrial over-the-air antenna, and for selecting one or more of the channels for recording the transmitted programs 150.

In another implementation, a device external to the communication server 402 (not shown in FIG. 4) may be responsible for recording the program 150 from the transmission source. In that case, the external device would then forward the transmitted program 150 to the communication server 402, either by way of the communication interface 414 or a separate communication interface not illustrated in FIG. 4.

The communication server 402 may operate as follows. The transmitted program 150 of interest is received at the communication server 402, at either the recording unit 416 or the communication interface 414. The processor 410 then causes the program 150 to be stored in the memory 412. Any number of programs 150 may be stored in the memory 412 at any one time, depending on the length and resolution of the programs 150, the storage capacity of the memory 412, and other factors.

The processor 410 may select which program 150 to record and store in the memory 412 based on a number of considerations. For example, the processor 410 or some external device not shown in FIG. 4 may select a particular program 150 if an expected number of requests for segments of the program 150 exceeds a predetermined threshold. Other considerations may include the expected length or number of identified segments expected.

In one embodiment, the processor 410 may cause one or more of the programs 150 stored in the memory 412 to be deleted or offloaded from the memory 412. The decision to delete or offload a program 150 may be influenced by a number of factors, such as the amount of time the program 150 has resided in the memory 412, a predetermined hierarchy for one or more stored programs 150, and the number of other programs currently being loaded into the memory 412.

With the program 150 loaded in the memory 412, the communication interface 414 may receive information 152 from a communication device identifying one or more segments of the program 150. For example, the information 152 may include an identification of the program, a starting point of a segment within the program, and an ending point of the segment within the program, as discussed above. For example, the information 152 may specify each of the starting and ending points by way of a frame number, a timestamp, or other form of pointer information.

Depending on the application, the communication server 402 may return an indication to the communication device sourcing the information 152 as to whether the transmitted program identified in the information is one of the programs 150 stored in the memory 412. If the program identified in the information 152 is not stored in the memory 412, a simple message may be returned from the communication server 402 to the device sourcing the information that the identified program is not present in the memory 412. Otherwise, the communication server 402 may return a positive indication that the requested program 150 is located in the memory 412, along with access information 153 indicating how the identified segment 156 of the stored program 150 may be accessed. The access information 153 may include, for example, a uniform resource locator (URL) of a web page providing access to the segment 156. Other examples may include any type of information uniquely identifying the specified segment 156.

After the segment 156 has been identified, the communication interface 414 may receive one or more requests 154 for access to the segment 156. In one example, the request 154 may include the access information 153 described above. In another implementation, the communication server 402 may provide a search menu or similar means by which a user may locate a particular segment of interest within the program 150.

In response to the request 154, the processor 410 may then deliver the requested program segment 156 from the memory 412 over the communication interface 414 to the communication device requesting the segment 156. For example, the communication interface 414 may stream the program segment 156 to the communication device, which the communication device may buffer in whole or in part before displaying the program segment 156 to a user. In another implementation, the communication interface 414 may download the entire program segment 156 as a data file over the communication interface 414.

The communication server 402 may receive multiple sets of information 152 from a number of communication devices that identify various segments 156 of the same stored program 150. No restriction need be imposed on the number or extent of each segment 156 of the program 150 identified by each set of information 152. As mentioned in conjunction with FIG. 3, each of the identified segments 156 may or may not overlap. Two or more segments 156 may be identical, as defined by their starting and ending points. In one embodiment, the processor 410 causes each set of information 152 received over the communication interface 414 to be stored in the memory 412 along with the recorded program 150. Each resulting segment 156 may then be requested by any communication device configured to communicate with the communication server 402 over the communication interface 414.

Over a period of time, the communication interface 414 may receive sets of information 152 identifying segments 156 of the program 150 that, when taken collectively, do not involve the entire program 150. As a result, the processor 410 may cause those portions of the program 150 that are not included within an identified segment 156 to be deleted from the memory 412. The processor 410 may initiate such an operation when, for example, a predetermined period of time has elapsed since processor 410 stored the program 150 in the memory 412, or since the communication interface 414 received the last set of information 152 identifying a segment 156 of the program 150.

In the event the communication interface 414 receives information 152 for a segment of a transmitted program that is not already stored in the memory 412, the communication interface 414 may instead receive the actual segment 450 of the program from a communication device. In response, the processor 410 may then transfer the received program segment 450 to the memory 412, thus making it accessible to other communication devices. More specifically, the communication interface 414 may receive a segment request (similar to the segment request 154 discussed above) for the received program segment 450. In response, the processor 410 may then transfer the received segment 450 from the memory 410 over the communication interface 414 to the communication device that originated the request for the segment 450.

Figure 5:
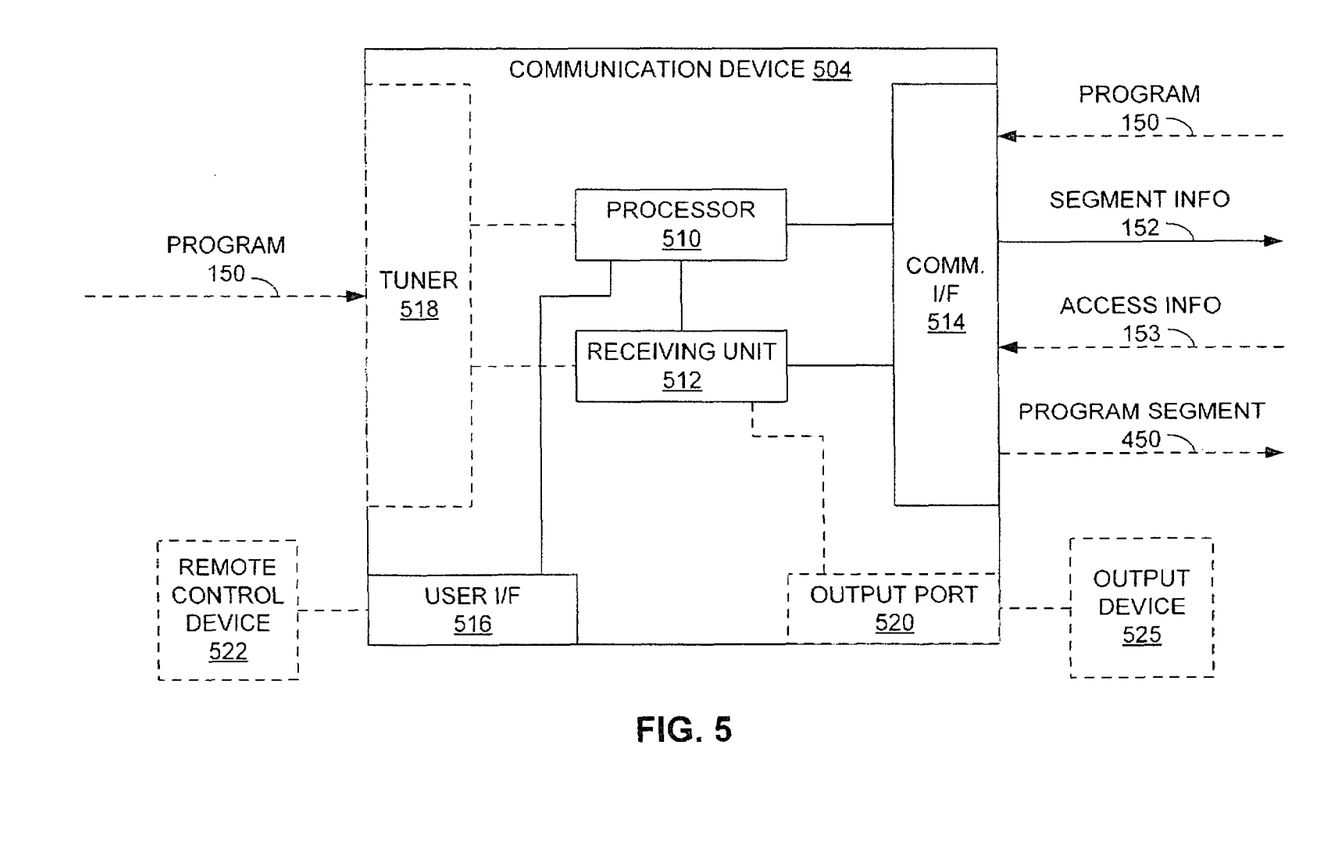
FIG. 5 is a block diagram of a communication device of the system of FIG. 2 according to an embodiment of the invention.

FIG. 5 provides a block diagram of a communication device 504 that in one embodiment may operate as the communication device 106 of FIG. 1 responsible for identifying the segments 156 of the program 150 stored in the communication server 102. The communication device 504 includes a processor 510, a receiving unit 512, a communication interface 514, and a user interface 516. Optionally, the communication device may also include one or more tuners 518 and an output port 520. As with FIG. 4, the connections shown in FIG. 5 between the various components of the communication device 504 indicate only one potential embodiment. In one implementation, the communication device 504 may be a broadcast programming receiver, such as a set-top box adapted to receive satellite programming signals, cable programming signals, or terrestrial over-the-air programming signals.

The processor 510 is configured to control the communication interface 514 and the receiving unit 512, as well as the tuner 518. Specific examples of the processor 510 may include any of the particular embodiments listed above in conjunction with the processor 410 of the communication server 402 described above. Similarly, particular implementations of the communication interface 514 may include the types, such as an IP interface, described above regarding the communication interface 414 of the communication server 402.

The receiving unit 512 is configured to receive one or more transmitted programs 150. In one embodiment, the receiving unit 512 includes circuitry for decoding, descrambling, and/or demultiplexing the programs 150, if necessary. In the case of the communication device 514 being a broadcast programming set-top box, the receiving unit 512 may also provide the DVR functionality discussed above in one example. In other words, in conjunction with the processor 510 and the user interface 516, the receiving unit 512 may allow a user to record one or more programs 150 received from a source external to the communication device 504. The receiving unit 512 may include any data storage employed to store the programs 150.

In one implementation of the communication device 504, the tuner 518 is employed to select a programming channel from a number of programming channels supplied by a content provider. For example, the tuner 518 of a satellite set-top box may receive a plurality of programming channels from one or more satellite signal transponders, from which the tuner 518 selects a single programming channel which provides a number of transmitted programs 150. In some examples, the communication device 504 may include more than one tuner 518 so that more than one programming channel may be selected at a time. In other environments, the tuner 518 may be configured to select a programming channel from a number of cable or terrestrial over-the-air programming channels.

In another embodiment, the receiving unit 512 may receive one or more programs 150 via the communication interface 514, as opposed to, or in addition to, the tuner 518. For example, the receiving unit 512 may receive one or more streaming or downloaded programs from an external source over the Internet.

The user interface 516 is configured to receive a first indication from a user of a starting point of a segment of the program 150 received by the receiving unit 512. The user interface 516 is also configured to receive a second indication from the user of the ending point of the segment. In one example, the user interface 516 is configured to receive signals from a remote control device 522. The signals are initiated by user interaction with the remote control device 522. In one embodiment, the user reviews the program 150 received by the receiving unit 512, and uses the remote control device 522 to identify the starting and ending points of a segment of the program 150 during playback of the program 150. To facilitate this operation, an output port 520 may display the program 150 to the user by way of a communicatively coupled output device 525, such as a television or video monitor, audio receiver, or the like. In another example, the communication device 504 may incorporate the functionality of the output device 525.

The processor 510 may then process the first and second indications to generate information 152 specifying the segment of interest in the program 150. The processor 510 may then transfer the generated information 152 over the communication interface 514. The communication server 102 may then receive this information 152 so that the communication server 102 may then satisfy requests for access to the segment specified by the information 152 by way of the same program 150 stored in the server 102. The information 152 may also include an identification of the program 150 including the identified segment. In accordance with this process, the user may specify multiple segments of the program 150, which may or may not overlap each other.

The communication device 504 may be configured to receive access information 153 from the communication server 402 as shown earlier in FIG. 4 indicating how the communication device 504 or another communication device may access the specified segment 156 (shown in FIG. 4) from the communication server 402. In response, the communication device 504 may disseminate the access information 153, such as by way of the communication interface 514, to other communication devices, such as computers, portable communication devices, and other set-top boxes. In another implementation, the communication server 402 may make the access information 153 directly available to other communication devices by way of a menu, web page, or similar means.

As noted earlier, the communication server 102 receiving the information 152 for a particular program may or may not have stored the associated program. As a result, the communication device 504 may be configured to receive a reply to the information 152 indicating this fact. In response, the processor 510 may transfer the actual program segment 450 (noted in FIG. 4) from the receiving unit 512 over the communication interface 514 to the communication server 402, which may then store the segment 450 and allow the communication device 504 or other communication devices to access the segment 450, as discussed above.

Various embodiments as described herein may provide any of a number of benefits. For example, with a communication server storing a copy of an audio and/or video program, a communication device need only send an indication of the starting and ending times of a desired segment of the program, thus eliminating a transfer of the actual segment from the communication device to the server. As a result, the communication bandwidth necessary between the communication server and several such communication devices may be greatly reduced. This reduced bandwidth may allow communication devices with less-than-broadband grade access to specify program segments for access, thus allowing greater "space-shifting" capability for viewing the segments. Moreover, the reduced bandwidth requirements still apply even if the communication server receives its copy of the transmitted program over the same communication network through which the server receives the information regarding starting and ending times of the segment, as the server only needs to receive the program once.

Further, the storage requirements of the communication server are greatly reduced, as only a single copy of the transmitted program being segmented is stored as a result, regardless of the number of segments of the program are specified by the communication devices. The server storage requirements may be still further lessened if portions of the program that are not included in any specified segment are deleted or offloaded.

Each particular implementation of the communication server may be tailored to fit the storage capacity and bandwidth limitations of the server. For example, decisions regarding which programs to store may depend upon an expected popularity of the program. With more program storage available, the server may be capable of lowering the popularity threshold a program must meet before being stored on the server. Further, segments for other programs not immediately stored on the server may still be transferred thereto by other communication devices.

Furthermore, with the server potentially providing a single source for the segments, the audio or video quality of the segments may be more tightly controlled. Further, less transcoding from one data format to another may be involved when the server acts as the lone provider of program segments.

While several embodiments of the invention have been discussed herein, other embodiments encompassed by the scope of the invention are possible. For example, while various embodiments have been described primarily within the context of satellite, cable, and over-the-air set-top boxes, other communication devices capable of specifying segments of audio and/or video programs, such as computers, personal digital assistants (PDAs), and mobile communication devices, may be utilized in other embodiments. Also, while particular emphasis has been placed on the use of IP connections for the transfer of information, programs, and program segments, other forms of communication capable of transferring such data may be utilized in other implementations. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method executable by a communication server to provide remote access to segments of a television program, the method comprising:
   receiving the television program, and storing a first copy of the television program at the communication server;
   receiving, by the communication server, first information specifying a beginning and an end of a first segment of the television program from a first communication device, wherein the first information is defined by a user of the first communication device viewing a second copy of the television program received by the first communication device, wherein the television program is received via a television broadcast received by both the communication server and the first communication device;
   subsequently receiving, by the communication server, a first request for access to the first segment defined by the user of the first communication device, wherein the first request is received from a second communication device; and
   in response to the first request, extracting the first segment of the television program from the first copy of the television program stored by the communication server and forwarding the extracted first segment of the television program to the second communication device.

2. The method of claim 1, further comprising:
   receiving second information specifying a beginning and an end of a second segment of the television program from a third communication device;
   receiving a second request for access to the second segment from a fourth communication device; and
   in response to the second request, extracting the first segment of the television program from the first copy of the television program stored by the communication device and transferring the extracted second segment of the television program from the communication server to the fourth communication device.

3. The method of claim 1, wherein the first request comprises an identification of the second communication device, and wherein the method further comprises the communication server considering the identification to thereby ensure that the first segment is only delivered to the identified second communication device.

4. The method of claim 1, further comprising:
   transferring a second segment of a second program from the first communication device to the communication server;
   storing the second segment of the second program at the communication server;

transferring a second request for access to the second segment of the second program from the second communication device to the communication server; and
in response to the second request, transferring the second segment of the second program from the communication server to the second communication device.

5. A communication server, comprising:
a memory configured to store a first copy of a television program;
a communication interface configured to receive first information from a television receiver, wherein the first information defines a beginning and an end of a first segment of the television program and is defined by a first user who is viewing a second copy of the television program via the television receiver, wherein the television program is received via a television broadcast received by both the communication server and the television receiver, and wherein the communication interface is further configured to receive a first request for access to the first segment of the television program from a second device; and
a processor configured to process the first request and, in response, extract the first segment of the television program from the first copy of the television program and transfer the extracted first segment of the television program to the second device over the communication interface.

6. The communication server of claim 5, wherein:
the communication interface is configured to receive second information from the television receiver identifying a beginning and an end of a second segment of the television program, and to receive a second request for access to the second segment of the stored television program; and
the processor is configured to process the second request to extract the second segment from the stored first copy of the television program based upon the second information and, in response, to transfer the extracted second segment of the stored television program from the memory over the communication interface.

7. The communication server of claim 5, wherein the communication interface is configured to receive the television program and to transfer the television program to the memory.

8. The communication server of claim 5, further comprising a recording unit configured to record the television program and to transfer the television program to the memory.

9. The communication server of claim 5, wherein the processor is configured to store the television program in the memory based on at least one of an expected number of requests for segments of the television program, an expected number of segments identified in the television program, and an expected length of the segments identified in the television program.

10. The communication server of claim 5, wherein the processor is configured to delete portions of the stored television program from the memory after an amount of time has elapsed, wherein the deleted portions of the stored television program are only those portions of the television program not included in any segment identified in the stored television program.

11. The communication server of claim 5, wherein the first information comprises an identification of the stored television program, a starting point of the first segment, and an ending point of the first segment.

12. The communication server of claim 5, wherein:
the first request comprises an identification of a receiving communication device; and
the processor is configured to transfer the first segment of the stored television program from the memory over the communication interface to only the receiving communication device.

13. The communication server of claim 5, wherein:
the communication interface is configured to receive further information from the television receiver defining a second segment of a second television program, to transfer the second segment of the second television program to the memory, and to receive a second request for access to the second segment of the second television program; and
the processor is configured to process the second request and, in response, to transfer the second segment of the second television program from the memory over the communication interface.

14. The communication server of claim 5, wherein the communication interface comprises an Internet Protocol interface.

15. A communication device operable by a user, the device comprising:
a television receiver configured to receive a television broadcast of a television program;
a user interface configured to receive inputs from the user comprising a first indication of a starting point of a first segment of the television program, and a second indication of an ending point of the first segment of the television program;
a communication interface; and
a processor configured to process the first indication and the second indication to generate first information specifying the first segment of the television program, and to transfer the first information over the communication interface to a communication server to thereby permit the communication server to, in response to a request from a second communication device, extract the first segment indicated by the user from a separate copy of the television program stored at the communication server, wherein the separate copy of the television program is received via the television broadcast received by both the communication server and the television receiver, and to transfer the extracted first segment of the television program to the second communication device.

16. The communication device of claim 15, wherein the communication interface is configured to transfer the television program to the communication server.

17. The communication device of claim 15, wherein:
the inputs from the user further comprise a third indication of a starting point of a second segment of the television program, and a fourth indication of an ending point of the second segment of the television program; and
the processor is configured to process the third indication and the fourth indication to generate second information specifying the second segment of the television program, and to transfer the second information to the communication server via the communication interface.

18. The communication device of claim 17, wherein the second segment overlaps the first segment.

* * * * *